Dec. 4, 1923.
J. S. HOLM
COMPUTER
Filed June 22, 1922
1,476,514
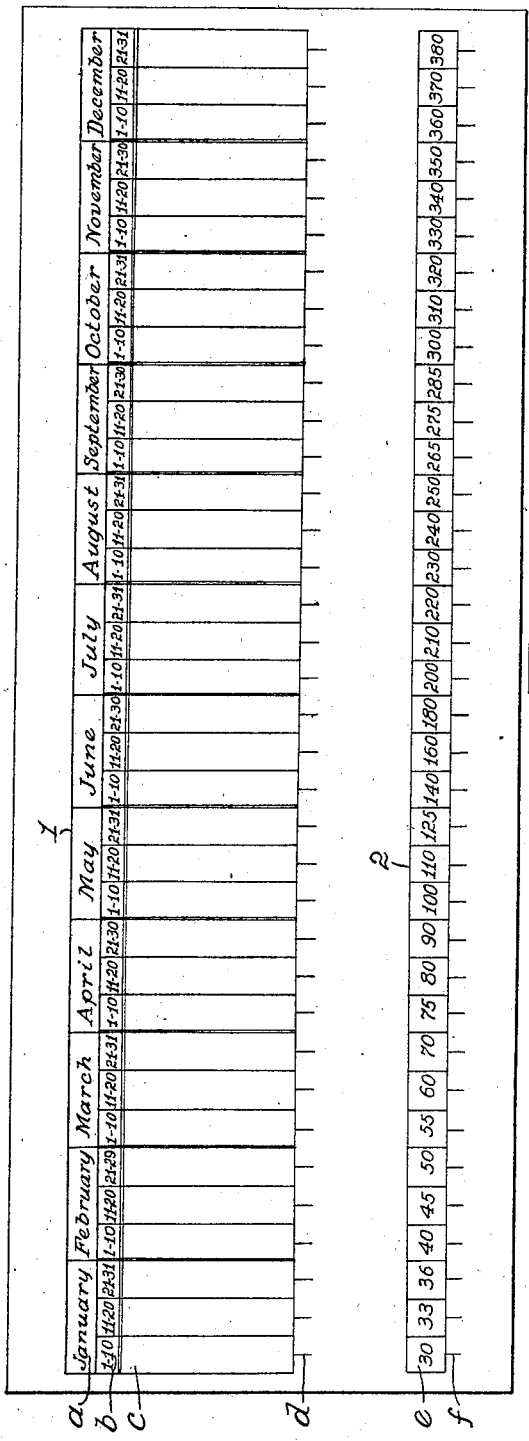

Patented Dec. 4, 1923.

1,476,514

UNITED STATES PATENT OFFICE.

JENS S. HOLM, OF CEDAR FALLS, IOWA.

COMPUTER.

Application filed June 22, 1922. Serial No. 570,075.

*To all whom it may concern:*

Be it known that I, JENS S. HOLM, a citizen of the United States of America, and a resident of Cedar Falls, Blackhawk County, Iowa, have invented certain new and useful Improvements in Computers, of which the following is a specification.

My invention relates to improvements in computers, and the object of my improvement is to supply tabular assemblages of forms and other data related to each other in their use, as means for determining weights of animals insured on dates of loss occurring later than the dates of insurance, whereby the assured may have advance knowledge of the amount of recovery fixed according to established rates of premium for said weights.

The appended drawing is a representation of assemblages of this kind placed in juxtaposition for convenient comparison.

Fig. 1 is a sheet containing opposed calendar periods and increasing series of weights related to said periods, and Fig. 2 is a premium schedule card used for comparison with the related contents of said sheet.

In the insuring of hogs or other animals against loss, from and after the date of a policy of insurance thereon, certain premium rates are established for selected terms of insurance, and it is usual to provide that the weight of an animal on the date of loss thereafter will determine the exact amount of recovery.

The tabular forms and assemblages of data as related to each other for reference and comparison are shown in the drawing in juxtaposition on a sheet Fig. 1, upon one face thereof for convenience.

The contents of the sheet of Fig. 1 may be printed upon the face of a policy of animal insurance, the premium schedule card of Fig. 2 being separate therefrom to be used by the insurance adjuster.

The tabular form numbered 1 is composed of a plurality of like bordered and ruled spaces, these spaces being arranged in horizontal alinement on the sheet, and each space inscribed at the head with the name of a month, the months occurring in succession in the row of spaces, as indicated by the letter *a*. These headings are separated from the spaces below by a horizontal ruled line. Each space is then divided into a number of vertical columnar spaces by means of vertical lines, in this instance each space is thus divided into three columnar spaces *c*, and the head of each space *c* is ruled off horizontally to provide spaces in which to enter as at *b* numerals in pairs indicating certain day intervals of the month inscribed above, in successive intervals to cover the entire length of the month. Each of the month spaces is equal in width to the width of each other month space, and the middle vertical line of each columnar space *c* is denoted by a short vertical scale mark *d*, for easily locating the positions of these spaces.

Below the assemblage 1, is another assemblage 2, comprising a horizontally alined row of bordered like spaces *e*, in which spaces are permanently printed or otherwise inscribed numerals in an increasing series to indicate certain weights of an animal, as advancing by increments at successive separated dates. These intervals of dates are shown in the said columnar spaces *c* of assemblage 1, so the horizontal width of each bordered space *e* is made equal to the width of each columnar space *c* to permit of comparison on the same scale, and this scale as shown at *f* by short vertical lines depending from the middles of the spaces *e* is the same as the scale shown by the lines *d* above.

When an animal is insured, its weight at that date is entered in the columnar space *c* under the proper month and day period *b*. In case of its loss, on a certain later date, the weight at that date to be settled for is positively indicated by scaling the interval on the assemblage 1 from the date of insurance to date of loss using the scale *d*, and by then transferring this measurement to the assemblage 2, starting from the numeral in a bordered space *e* which is the same as the weight of the animal when insured, the comparison thus indicating on the scale *f* at another space *e* the numeral which should be accepted as the agreed upon weight of the animal at the said date of its loss.

This method of determining settlements, is conducive to certainty, both in regularizing the practice in rating, and in adjusting losses, preventing disputes.

When desired, though not necessarily, a third tabular assemblage 3 may be used relating to the other assemblages 1 and 2. This is a card containing a schedule of premiums, and has three parallel vertical columns, containing respectively an increasing series of weight numerals at *g*, a series of decreasing time intervals at *h*, and of a graduated series of premium rates at *i*. This premium schedule is used to determine the premium as follows. The minimum and maximum limits of weights of animals to be insured being fixed at 30 pounds and at 180 pounds respectively, with insurable weights increasing between these at arbitrarily determined amounts as in column *g*, the numeral in column *h* opposite the weight in column *g* of the animal when insured, denotes the full term for which the animal is insured from the date of insurance as marked on the policy as above described in assemblage 1. The premium rate in cents therefor is shown opposite in column *i*, the rates decreasing as the term of insurance is less. The adjuster holds the premium schedule, and uses this in making an adjustment of loss. By using these, the premiums on insured animals may be readily determined, based on either weight at time insured with time interval to limit of 200 pounds, but of course these rates are changeable at will of the insuring company.

Having described my invention, what I claim as new, and desire to secure by Letters Patent, is:

1. A computer of the character described, comprising on a sheet an assemblage of alined like ruled forms respectively inscribed with the successive names of the months, each form being subdivided into a number of vertical columnar spaces with each space inscribed at the head with numerals denoting a certain subdivision of the month, and each columnar space being appropriated for the entry of a weight; and on said sheet in juxtaposition another assemblage of horizontally alined like separated spaces on which are inscribed permanently numbers denoting successively increasing weights, these permanent numbers relating to numbers to be inscribed on the columnar spaces of the first-mentioned assemblage.

2. A computer of the character described, comprising on a sheet an assemblage of alined like ruled forms respectively inscribed with the successive names of the months, each form being subdivided into a number of vertical columnar spaces of the same width and with each space inscribed at its head with numerals denoting a certain subdivision of the month, and each columnar space being appropriated for the entry of a weight, and a scale annexed to said columnar spaces to indicate the middle vertical lines thereof; and another assemblage on said sheet comprising a row of horizontally alined bordered spaces on which are permanently inscribed weights of successively greater amounts, and a scale annexed to said bordered spaces to indicate the middle vertical lines thereof, both said scales being alike in their said widths of subdivisions.

3. A computer of the character described, comprising a tabular assemblage of alined like ruled forms respectively inscribed with the successive names of the months, each form being subdivided into a number of vertical columnar spaces with each space inscribed at the head with numerals denoting a certain subdivision of the month, and each columnar space being appropriated for the entry of a weight; another tabular assemblage of horizontally alined spaces on which are inscribed numbers denoting successively increasing weights which relate to weight numbers to be inscribed on the columnar spaces of the first assemblage; and a third tabular assemblage, containing a column of successively increasing weight numbers, with parallel columns and numerals relating respectively to said weight numbers to denote a decreasing series of time intervals, and premium rates based on said weights and time intervals.

Signed at Waterloo, Iowa, this 24th day of May, 1922.

JENS S. HOLM.